United States Patent
McEwan et al.

(10) Patent No.: US 9,663,096 B2
(45) Date of Patent: May 30, 2017

(54) METHODS AND SYSTEMS FOR MITIGATING FUEL INJECTOR LEAK

(71) Applicant: Ford Global Technologies, LLC, Dearborn, MI (US)

(72) Inventors: Douglas James McEwan, Royal Oak, MI (US); Chris Paul Glugla, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 182 days.

(21) Appl. No.: 14/627,909

(22) Filed: Feb. 20, 2015

(65) Prior Publication Data
US 2016/0245221 A1 Aug. 25, 2016

(51) Int. Cl.
| | |
|---|---|
| F02D 41/22 | (2006.01) |
| B60W 10/06 | (2006.01) |
| B60W 10/11 | (2012.01) |
| F02D 41/00 | (2006.01) |
| F02D 41/38 | (2006.01) |

(Continued)

(52) U.S. Cl.
CPC ............ *B60W 10/06* (2013.01); *B60W 10/11* (2013.01); *F02D 41/008* (2013.01); *F02D 41/221* (2013.01); *F02D 41/3845* (2013.01); *F02D 41/40* (2013.01); *F02M 65/00* (2013.01); *F02M 65/006* (2013.01); *F02D 2041/225* (2013.01); *F02D 2041/226* (2013.01); *Y02T 10/44* (2013.01)

(58) Field of Classification Search
CPC ..... B60W 10/06; B60W 10/11; F02D 41/008; F02D 41/40; F02D 41/3845; F02D 41/221; F02D 2041/225; F02D 2041/226; F02M 65/00; F02M 65/006
USPC .... 701/103–107; 73/114.38, 114.43, 114.45; 123/299, 300, 445, 446, 456, 457, 479, 123/480, 510, 511
See application file for complete search history.

(56) References Cited

U.S. PATENT DOCUMENTS

| | | | |
|---|---|---|---|
| 5,611,314 A | 3/1997 | Fuwa et al. | |
| 5,685,268 A | 11/1997 | Wakemen | |

(Continued)

FOREIGN PATENT DOCUMENTS

| | | |
|---|---|---|
| WO | 2009019345 A1 | 2/2009 |
| WO | 2014138970 A1 | 9/2014 |

*Primary Examiner* — Hai Huynh
(74) *Attorney, Agent, or Firm* — Julia Voutyras; McCoy Russell LLP

(57) ABSTRACT

Methods and systems are provided for performing mitigating actions in response to detecting a fuel injector leak. In one example, a method may include in response to detecting a fuel injector leak, performing first high pressure mitigating actions including increasing a fuel rail pressure, increasing a pulse width delivered to the leaking fuel injector, and commanding fuel injection during compression stroke; in response to the first mitigating actions not reducing the leak below a threshold rate, performing second high pressure mitigating actions including increasing the fuel rail pressure, increasing the pulse width delivered to the leaking injector, and commanding fuel injection during intake stroke for a cylinder receiving fuel from the leaking injector; and in response to the second mitigating actions not reducing the leak below the threshold rate, reducing the fuel rail pressure, and commanding intake stroke fuel injection to all cylinders.

20 Claims, 8 Drawing Sheets

(51) Int. Cl.
*F02D 41/40* (2006.01)
*F02M 65/00* (2006.01)

(56) References Cited

U.S. PATENT DOCUMENTS

| | | | |
|---|---|---|---|
| 5,708,202 A | 1/1998 | Augustin et al. | |
| 5,715,786 A | 2/1998 | Seiberth | |
| 5,974,865 A | 11/1999 | Dambach | |
| 6,138,638 A * | 10/2000 | Morikawa | F02D 41/061 123/295 |
| 6,564,616 B2 * | 5/2003 | Antonioli | F02D 41/0085 73/114.38 |
| 6,871,633 B1 * | 3/2005 | Date | F02D 33/006 123/445 |
| 7,337,652 B2 * | 3/2008 | Shamine | F02M 55/002 73/40 |
| 7,762,234 B2 | 7/2010 | Ulrey et al. | |
| 7,805,985 B2 | 10/2010 | Friedl et al. | |
| 8,833,147 B2 * | 9/2014 | Tsuiki | F02D 41/221 123/299 |
| 2010/0268441 A1 * | 10/2010 | Yoshiume | F02D 41/062 701/103 |
| 2015/0167572 A1 * | 6/2015 | Lee | F02D 41/3809 123/294 |
| 2016/0230687 A1 * | 8/2016 | Takeuchi | F02D 41/22 |

\* cited by examiner

METHODS AND SYSTEMS FOR MITIGATING FUEL INJECTOR LEAK

FIELD

The present description relates generally to methods and systems for controlling a vehicle engine to perform mitigating actions in response to detecting a fuel injector leak.

BACKGROUND/SUMMARY

Fuel delivery systems may include a direct fuel injector to inject fuel at high pressure directly into a cylinder. Highly pressurized fuel in the fuel delivery system may be particularly useful during crank and other times during engine operation for efficient combustion, etc. The direct fuel injector may deliver fuel in proportion to a fuel injector pulse width of a signal from an engine controller. However, due to aging, fuel contamination, or hardware failure, fuel injector may leak fuel unintentionally. Leaks in the fuel injector may cause the corresponding cylinder receiving fuel from the injector to misfire. Consequently, non-combusted air-fuel mixture may be displaced into the exhaust. The non-combusted air-fuel mixture in the exhaust may participate in an exothermic reaction at an exhaust catalyst generating excess amounts of heat. The heat generated may cause excessive increase in exhaust temperatures, which may result in thermal degradation of the exhaust components.

One example approach for mitigating fuel injector leak is shown by Wakemen et al. in U.S. Pat. No. 5,685,268. Therein, in response to detecting leakage in the fuel delivery system, the engine may be operated in a limp-home mode at reduced fuel pressure.

However, the inventors herein have identified potential issues with such an approach. As an example, build-up of deposits in the fuel injector can prevent the injector from closing completely, resulting in fuel leaking into the corresponding cylinder. Reducing the fuel rail pressure alone may not remove the deposits. As a result, the engine may be forced to shut down prematurely to prevent further leakage from the clogged injector until the clogged injector is replaced, or removed and cleaned.

In one example, the above issue may be addressed by a method, comprising: in response to diagnosing leak in a fuel injector, performing first high pressure mitigating actions for a first number of cylinder cycles, the first mitigating actions including increasing fuel rail pressure to a first rail pressure; and injecting fuel to all cylinders during compression stroke; and if the leak persists, reducing the rail pressure to a low rail pressure; and injecting fuel to all cylinders during intake stroke. In this way, by performing high pressure mitigating actions, blockage in the fuel injector that may prevent the injector from sealing may be reduced.

As an example, a fuel injector diagnostic test may identify leak in an injector (herein, also referred to as the leaking injector) delivering fuel to a cylinder. In response to diagnosing the leak, a controller may perform a first set of mitigating actions in order to blow out any potential deposits or blockage (accumulated due to contaminants in the fuel, aging, etc.) clogging the fuel injector and thus preventing the injector from sealing when fuel injection is not desired. The first set of mitigating actions may include increasing a fuel rail pressure (e.g., the rail pressure may be increased to a first pressure above a threshold pressure), increasing a pulse width delivered to the injector, and commanding fuel injection during compression stroke. Further, the first set of mitigating actions may be performed for a first number of cylinder cycles. In this way, by delivering increased amount of fuel during compression stroke at high pressure, deposits clogging the fuel injector may be blown-out.

Further, if the leak continues to persist after completion of the first set of mitigating actions, a second set of high pressure mitigating actions may be performed, which may include increasing the fuel rail pressure (e.g., the rail pressure may be increased to a second pressure above a threshold pressure), increasing the pulse width delivered to the injector, and commanding fuel injection to a cylinder receiving fuel from the leaking injector during intake stroke. In this way, suction generated by delivering increased amount of fuel at high pressure during intake stroke may be utilized to facilitate removal of the deposits clogging the injector when blowing out the injector by delivering fuel at high pressure during compression stroke did not result in stopping the leak. Still further, if the leak in the injector continues to persist, low pressure mitigating actions which include reducing the fuel rail pressure to a third pressure below the threshold pressure; and adjusting fuel injection timing to intake stroke injection may be utilized to reduce the leakage rate. However, after performing the second set of high pressure mitigating actions, if the leak is no longer detected, engine may resume normal operation based on the operating conditions.

In this way, by performing high pressure mitigating actions upon detecting leak in the fuel injector, deposits clogging the fuel injector may be reduced. As a result, an amount of fuel leaking out of the injector and into the cylinder may be reduced. Consequently, an amount of fuel available to participate in exothermic reactions at the catalytic converter may be reduced, thereby preventing excessive increase in exhaust temperatures and the resulting thermal degradation of the exhaust components. Further, during conditions when the high pressure mitigating actions result in reducing the leakage rate rather than complete stoppage of fuel leak, fuel penalty incurred until necessary repairs can be made may be reduced. Still further, by reducing the leakage rate the vehicle may not be disabled prematurely, and may continue to operate until necessary repairs can be made.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
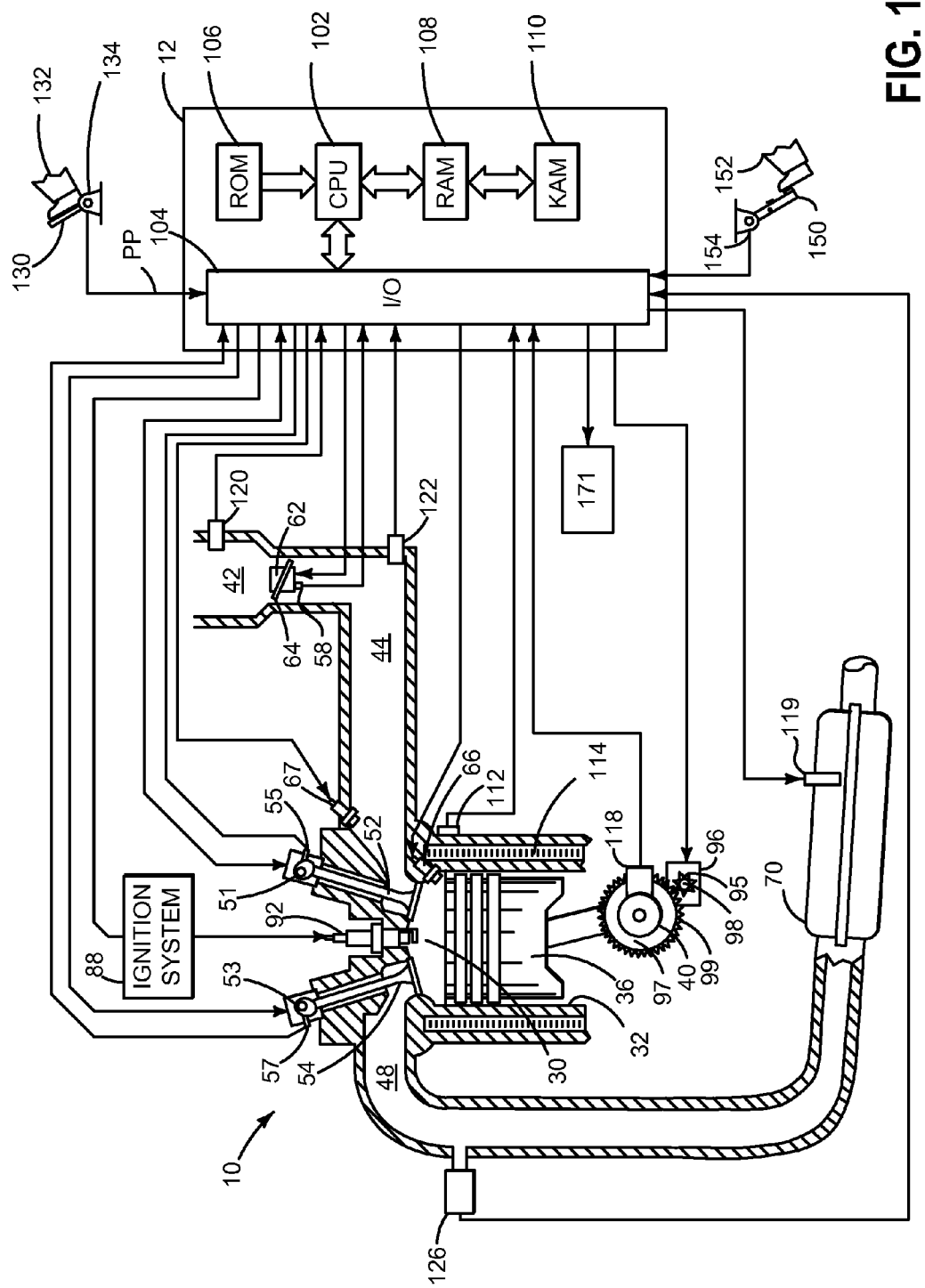
FIG. 1 shows a schematic diagram of an engine.
Figure 4:
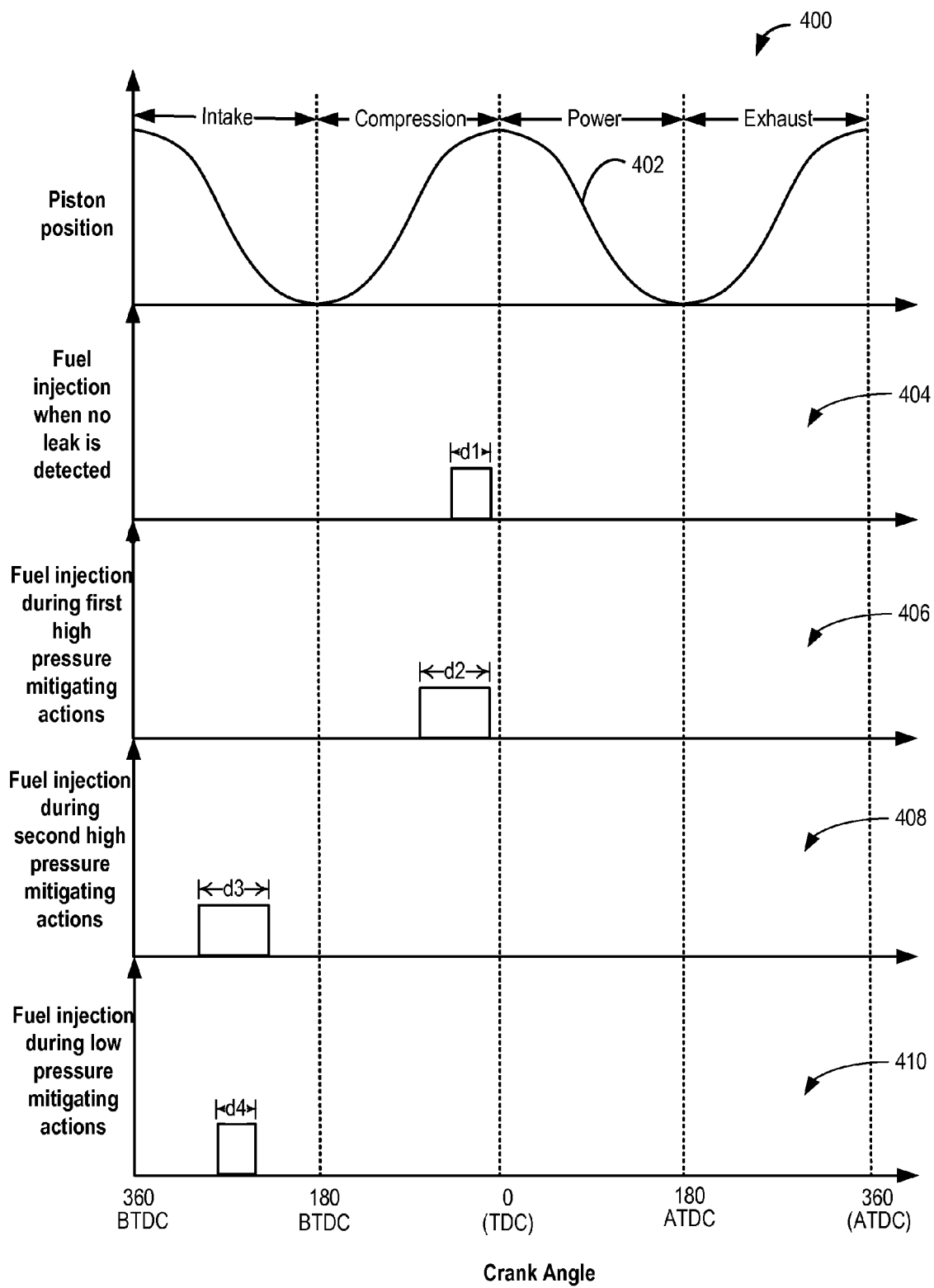
FIG. 4 shows an example fuel injection profile according to the present disclosure.
Figure 5:
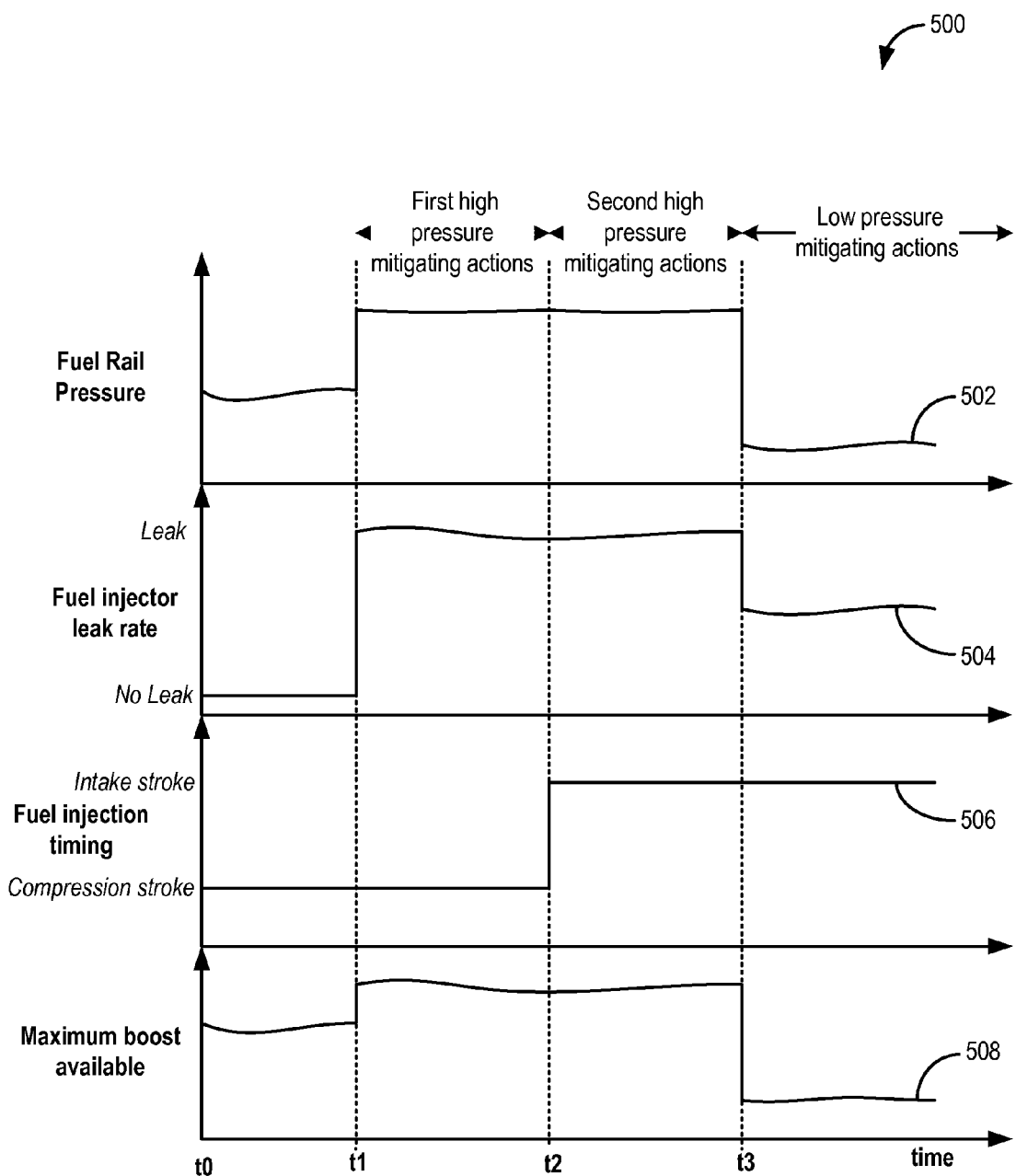
FIG. 5 shows example high pressure fuel injector leak mitigation and low pressure fuel injector leak mitigation according to the present disclosure.
Figure 6:
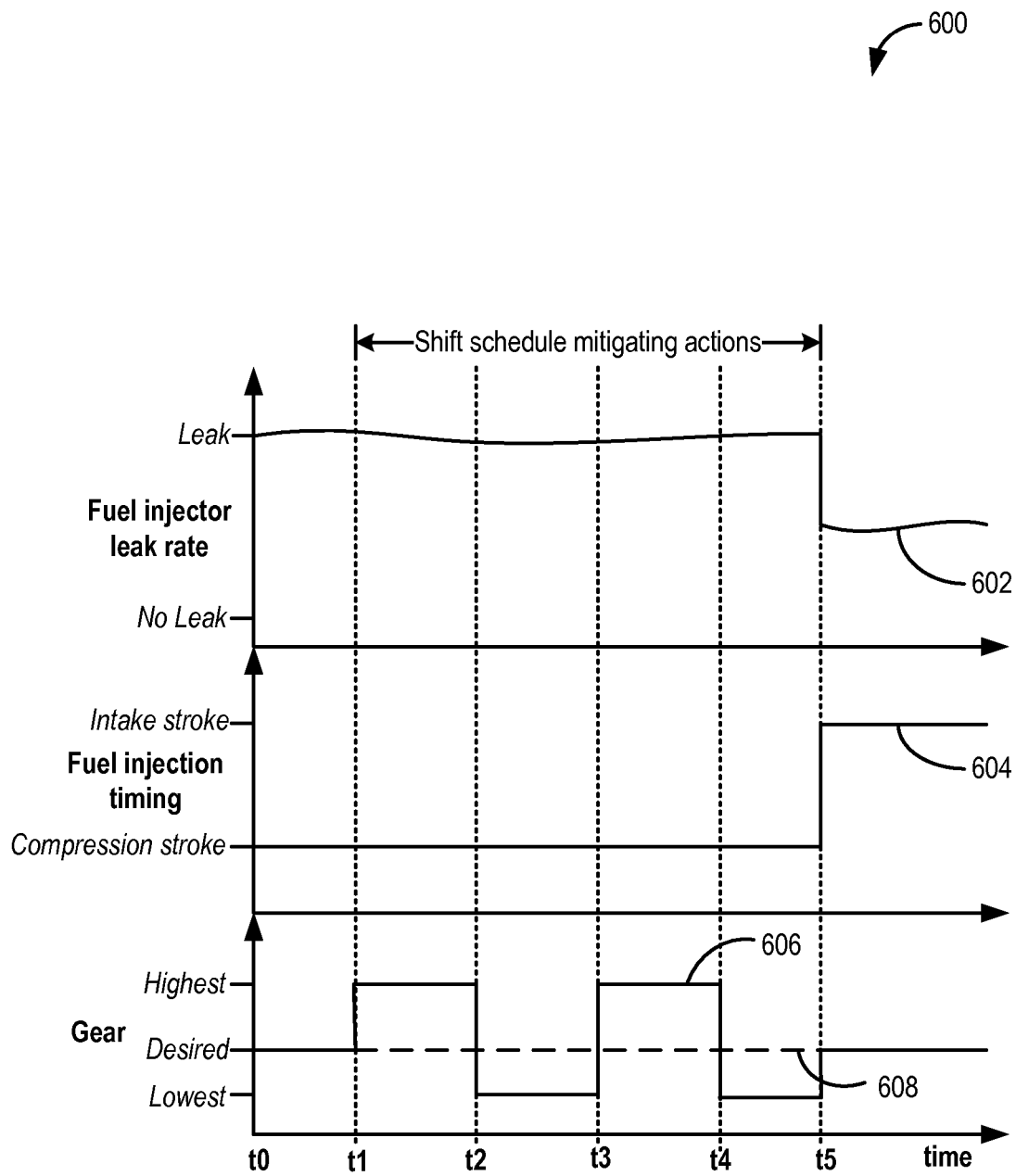
FIG. 6 shows example shift schedule mitigation according to the present disclosure.

The present description is related to mitigating leak diagnosed in a fuel injector. Fuel injectors may be incorporated into a fuel delivery system, such as the fuel delivery system of FIG. 2 for delivering fuel to an engine as is shown in FIG. 1. In response to diagnosing a leak in the fuel injector, a controller, such as controller 12 at FIGS. 1-2 may be configured to perform control routines according to the methods of FIGS. 3A-3C to perform first high pressure mitigating actions, second high pressure mitigating actions, and shift schedule mitigating actions to blow out or draw out any potential contaminant clogging the fuel injector and causing the fuel injector to leak. Further, in response to the high pressure and shift schedule mitigating actions reducing a leakage rate of the leak below a threshold rate, the engine may resume normal engine operation based on current engine operating conditions. However, if the high pressure and shift schedule mitigating actions do not reduce the leakage rate below the threshold rate, low pressure mitigating actions may be performed in order to reduce leakage rate. Example fuel injection profile utilized when performing the high pressure and low pressure mitigating actions is shown at FIG. 4. Example high pressure leak mitigation and low pressure leak mitigation according to the present disclosure is shown at FIG. 5. Example shift schedule leak mitigation is shown at FIG. 6.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Direct fuel injector 66 is shown positioned to inject fuel directly into cylinder 30, which is known to those skilled in the art as direct injection. Fuel injector 66 delivers liquid fuel in proportion to a voltage pulse width or fuel injector pulse width of a signal from controller 12. Fuel is delivered to fuel injector by a fuel system (not shown) including a fuel tank, fuel pump, and fuel rail (not shown). In addition, intake manifold 44 is shown communicating with optional electronic throttle 62 which adjusts a position of throttle plate 64 to control air flow from air intake 42 to intake manifold 44. Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a position sensor 154 coupled to brake pedal 150 for sensing force applied by foot 152, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle. Further, in some examples, other engine configurations may be employed, for example a diesel engine with multiple fuel injectors. Further, controller 12 may communicate conditions such as degradation of components to light, or alternatively, display panel 171.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g., when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g., when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

As described above, FIG. 1 shows only one cylinder of a multi-cylinder engine, and that each cylinder may similarly include its own set of intake/exhaust valves, fuel injector, spark plug, etc.

In one example, the system of FIG. 1 may provide for a system, comprising: an engine including a cylinder; a direct fuel injector in fluidic communication with the cylinder; and a controller including executable instructions stored in non-transitory memory for: in response to diagnosing a leak in the fuel injector, for a first number of cylinder cycles, increasing a fuel rail pressure of a fuel rail delivering fuel to the injector to a first rail pressure above a threshold pressure; and commanding fuel injection during compression stroke; and in response to continued detection of leak after the first number of cylinder cycles, for a second number of cylinder cycles, increasing the fuel rail pressure to a second rail pressure above the threshold pressure; and commanding fuel injection during intake stroke for the cylinder while commanding fuel injection during compression stroke for remaining cylinders in the engine.

The system further includes wherein the controller includes further instructions for reducing the fuel rail pressure to a third rail pressure lower than the threshold pressure, and commanding fuel injection to all cylinders in the engine during intake stroke in response to continued detection of leak in the injector after performing the second number of cycles.

Figure 2:
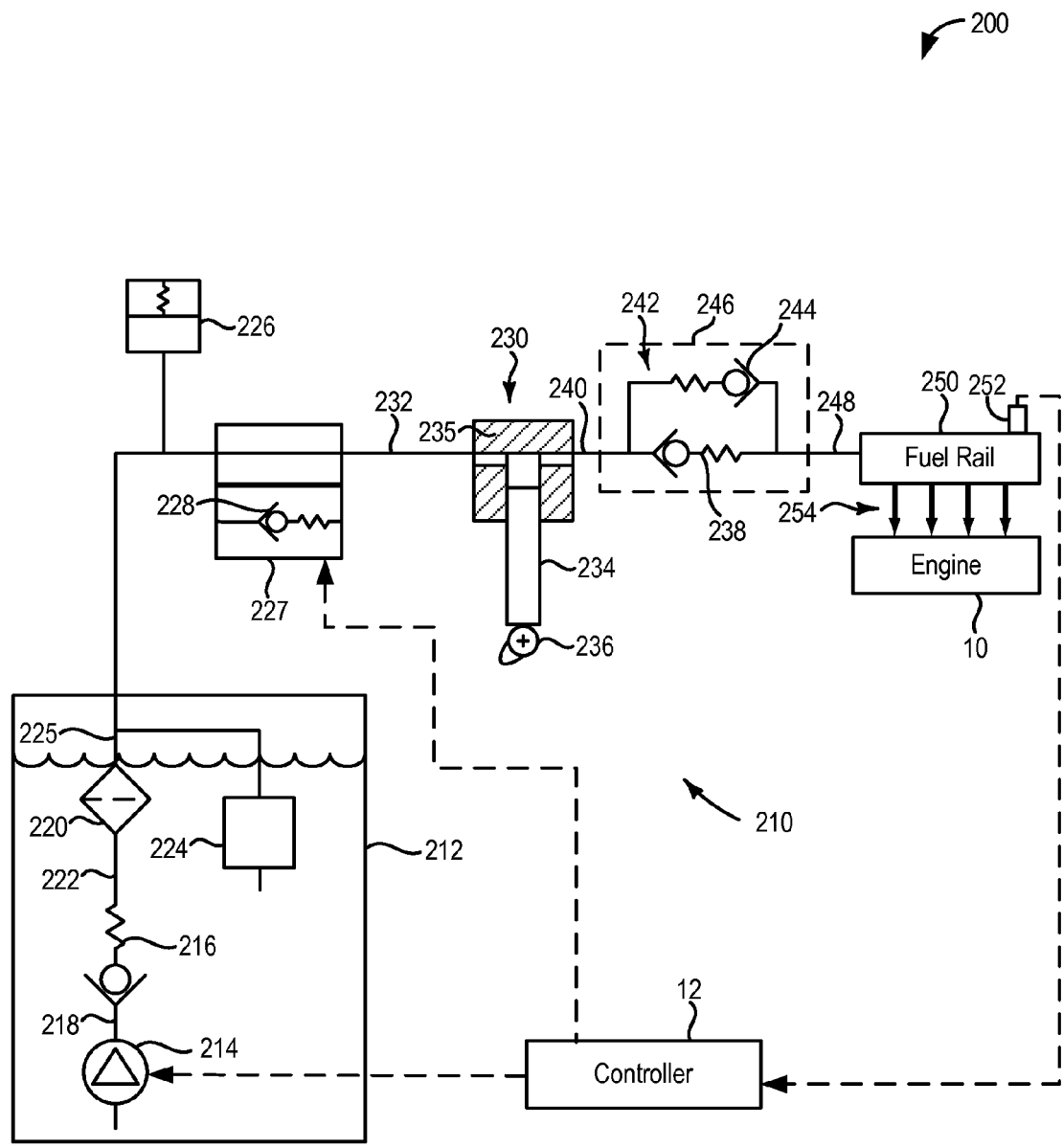
FIG. 2 shows a schematic depiction of the fuel delivery system for the internal combustion engine depicted at FIG. 1.

FIG. 2 shows a diagram of a fuel delivery system 210 that may be used to deliver fuel to the internal combustion engine 10, shown in FIG. 1. The fuel delivery system may include a fuel tank 212 substantially surrounding a lower pressure fuel pump 214. In one example, the lower pressure fuel pump 214 may be an electronically actuated lift pump. In another example, lower pressure fuel pump 214 may be another suitable pump capable of delivering fuel at an increased pressure to downstream components, such as a rotodynamic pump. The lower pressure fuel pump 214 may be actuated by a command signal sent from controller 12. In some examples, a control module (not shown) may control the actuation of pump 214.

Furthermore, the lower pressure pump may increase the downstream pressure in the fuel delivery system. The lower pressure pump may be fluidly coupled to a check valve 216, represented by the standard ball and spring symbol, by fuel line 218. Check valve 216 allows fuel to travel downstream, under some conditions, and impedes fuel from traveling upstream when there is a sufficient pressure differential. In another example, other suitable valves may be used that can impede fluid from traveling upstream into the fuel tank. Check valve 216 may be fluidly coupled to a fuel filter 220 by a fuel line 222. The fuel filter may remove unwanted particles from the fuel in the fuel line. A fuel pressure regulator 224 may be coupled to fuel line 225.

Again referring to FIG. 2, the fuel line 225 may extend out of the fuel tank fluidly coupling the fuel filter and a fuel pressure accumulator 226. In some examples, the fuel pressure accumulator may be a Freundenberg fuel pressure accumulator. In other examples, the fuel pressure accumulator may be another suitable fuel accumulator that allows a greater amount of fuel to be stored in the fuel delivery system, downstream of the lower pressure pump. Yet in other examples, the fuel pressure accumulator may be removed. A solenoid valve 227 may be fluidly coupled downstream of the fuel pressure accumulator. Solenoid valve 227 may include a check valve 228. Controller 12 may be electronically coupled to solenoid valve 227. In this example, when solenoid valve 227 is unpowered, fluid is allowed to flow freely through the valve. However, when solenoid valve 227 is powered by the controller, check valve 228 is configured to impede fluid from traveling upstream of check valve 228, under some conditions. In other examples, check valve 228 may be configured to impede fluid from traveling upstream of the valve when solenoid valve 227 is powered. The solenoid valve may be controlled synchronous to the higher pressure pump's cam position, to achieve an effective displacement of 0 to 0.25 cc per stroke.

A higher pressure pump 230 may be coupled downstream of the fuel pressure accumulator 226 by a fuel line 232. In this example, the higher pressure fuel pump is mechanically actuated positive displacement pump that includes a piston 234, a cylinder 235, and a cam 236. The higher pressure pump may use mechanical energy, produced by the engine, for actuation. In other examples, the higher pressure pump may be another suitable pump such as an electronically actuated pump.

A check valve 238 may be coupled downstream of the higher pressure pump by fuel line 240. Bypass fuel line 242 may be coupled directly upstream and downstream of check valve 238. The bypass fuel line may contain a pressure relief valve 244. In this example, pressure relief valve 244 is a check valve, represented by the industry standard ball and spring. In other examples, pressure relief valve may be another suitable valve which prevents the pressure downstream of valve 244 from becoming too high and possibly damaging downstream components as well as impedes fuel from traveling upstream under some conditions. In some examples, check valve 238 and bypass fuel line 242 may be referred to as a parallel port pressure relief valve PPRV 246.

A fuel rail 250 may be coupled to the parallel port pressure relief valve 246 by fuel line 248. A pressure sensor 252 may be coupled to the fuel rail. The pressure sensor may be electronically coupled to controller 12. Furthermore, the pressure sensor may measure the pressure of the fuel in the fuel rail. In other examples, the pressure sensor may be coupled to another location in the fuel delivery system downstream of the higher pressure pump. In some examples, a temperature sensor (not shown) may be coupled to the fuel rail. The temperature sensor may measure the temperature of the fuel rail. The fuel rail may be fluidly coupled to a series of fuel injectors 254. The fuel injectors may deliver fuel to the engine 10. Due to aging, fuel contamination, and/or hardware failure, one or more fuel injectors 254 may leak fuel unintentionally. Detection of leak and mitigation actions may be performed to satisfy various emission monitors, protect hardware from damage, and prevent excess exhaust temperature due to increased probability of misfire resulting from injector leakage. Details of diagnosing leak and performing mitigating actions to reduce fuel injector leakage rate from the fuel injection system shown in FIG. 2 are discussed in more detail with respect to FIGS. 3A-6.

Figure 3A:
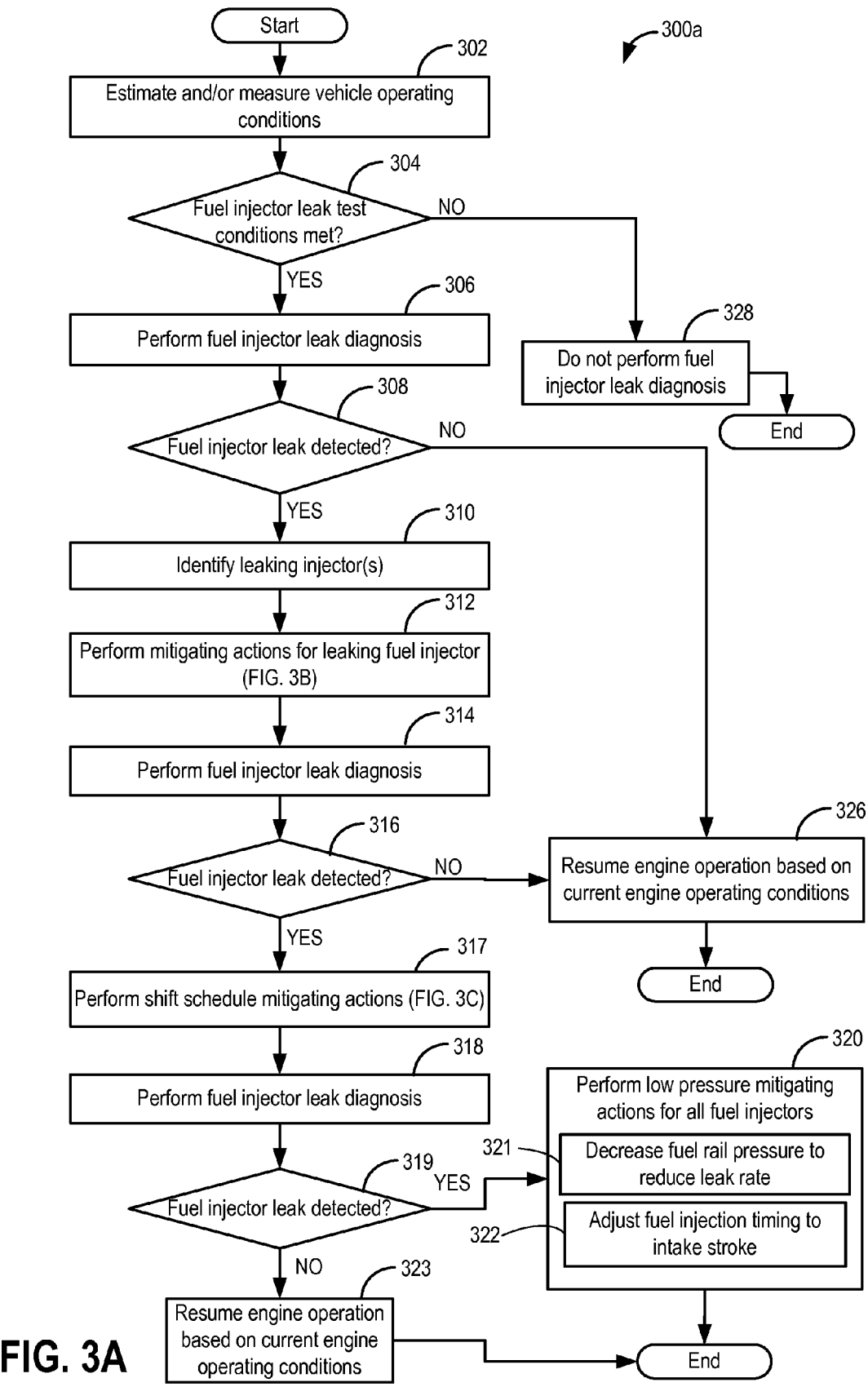
FIG. 3A shows a flow chart illustrating an example method for diagnosing leak in a fuel injector included in the fuel delivery system of FIG. 2, and performing mitigating actions to reduce fuel injector leak.

Turning to FIG. 3A, it shows an example method 300*a* for performing mitigating actions in response to detecting leak in a fuel injector delivering fuel to an engine, such as engine 10 depicted at FIG. 1. The method of FIG. 3 may be included in the system of FIGS. 1-2 as executable instructions stored in non-transitory memory of a controller such as controller 12 depicted at FIGS. 1-2.

At 302, method 300 includes estimating and/or measuring vehicle operating conditions. The estimated conditions may include, for example, engine speed (Ne), vehicle speed (Vs), load, engine temperature, combustion air-fuel ratio (AFR), exhaust catalyst temperature, ambient conditions, pedal position, etc.

Next, at 304, method 300 includes determining if conditions for fuel injector leak diagnosis are met. For example, the conditions for fuel injector leak diagnosis may be based on a type of fuel injector leak diagnosis that may be performed, and may include determining if a threshold duration has elapsed since the last diagnostic routine was performed. In one example, if the leak diagnosis is based on fuel rail pressure decay, the fuel injector leak diagnostic routine may be performed by the controller during an engine-off condition, and/or a deceleration fuel shutoff (DFSO) operation. In another example, if the leak diagnosis is based on monitoring crankshaft acceleration or gas torque resulting from combustion in a cylinder, the fuel injector leak diagnostic routine may be performed during a DFSO operation. In some other examples, the controller may decide to not activate a fuel injector diagnostic routine if the engine is operating under high loads. If fuel injector leak diagnostic conditions are not met, method 300 may return without performing fuel injector leak diagnosis. If fuel injector leak diagnostic conditions are met, method 300 proceeds to 306.

At 306, method 300 includes performing fuel injector leak diagnosis. In one example, performing fuel injector leak diagnosis may include monitoring a change in fuel rail pressure at a start of injection event. For example, an amount of decrease in fuel rail pressure during start of injection may be monitored (e.g., by utilizing a pressure sensor). In response to the amount of decrease less than a threshold amount, it may be determined that the injector was already open prior to the command to open, and accordingly, fuel injector leak may be indicated.

In another example, performing fuel injector leak diagnosis may include monitoring a change in rail pressure over a period of time during a DFSO operation. For example, during DFSO, fuel is shut-off to all cylinders. If no leak is present, then the change in fuel rail pressure may be less than a threshold change. However, if leak is present, then the change in fuel rail pressure may reach the threshold change or may be greater than the threshold change.

In still another example, performing fuel injector leak diagnosis may include monitoring an increase in crankshaft acceleration and/or gas torque output during a DFSO condition. For example, during DFSO operation, while fuel is shut-off to all the cylinders, intake/exhaust valves may continue to operate. Consequently, air may be moved through the cylinder. Further, during DFSO, spark may be disabled in order to increase a life span of a spark plug providing the spark. However, during fuel injector leak diagnosis, spark may be provided for a given cylinder so that if there is a leak, an air/fuel mixture may be present in the cylinder and consequently, the spark may trigger a combustion event. Consequently, crankshaft acceleration may increase and engine torque output may increase. Therefore, during DFSO, in response to crankshaft acceleration greater than a threshold acceleration and/or an increase in engine torque output greater than a threshold increase, fuel injector leak may be detected. In this way, fuel injector leak may be diagnosed by monitoring crankshaft acceleration and/or torque output during DFSO. Further, the diagnosis may be performed until all injectors are evaluated for leaks. For example, fuel injector leak diagnosis may be performed for an injector I1 providing fuel to a cylinder 1 by providing spark to cylinder 1 (and not providing spark to the remaining cylinders) for a predetermined number of cylinder cycles and monitoring for changes in crankshaft acceleration and/or torque output; subsequently an injector I2 providing fuel to a cylinder 2 may be tested by providing spark to cylinder 2 (and not providing spark to the remaining cylinders) for the predetermined number of cylinder cycles and monitoring the resulting changes in crankshaft acceleration and/or torque output, and so on until all the cylinders are tested.

Upon performing fuel injector leak diagnosis, method 300a proceeds to 308. At 308, method 300a may include determining if fuel injector leak is detected based on the fuel injector leak diagnosis. If the answer at 308 is NO, then fuel injector leak is not detected and accordingly method 300 proceeds to 326. At 326, a fuel leak detection routine may end and engine operation may be resumed based on the current engine operating conditions. Returning to 308, if the answer at 308 is YES, then fuel injector leak is present, and accordingly, method 300 proceeds to 310.

At 310, method 300 may include identifying one or more fuel injectors with leak, and further includes identifying a cylinder corresponding to each of the leaking fuel injector. That is, the cylinder which receives fuel from the leaking fuel injector may be identified. For example, fuel injector I1 may deliver fuel to cylinder 1. Fuel injector leak diagnosis by monitoring crankshaft acceleration or engine torque during DFSO may indicate an increase in crankshaft acceleration above the threshold in response to providing spark to cylinder 1. Therefore, it may be determined that due to leak from injector I1, air/fuel mixture was present in cylinder 1, which resulted in combustion and hence increase in crankshaft acceleration (or engine torque output), when spark was provided to cylinder 1. In this way, injector I1 may be identified as the fuel injector with leak, and cylinder 1 may be identified as the cylinder receiving fuel from the leaking injector. While the above example illustrates identifying one leaking cylinder, it must be appreciated that more than one leaking fuel injector and the corresponding cylinders may be identified.

Upon identifying the fuel injector with leak, method 300 proceeds to 312. At 312, method 300 may include performing mitigating actions to reduce the leak, and hence reduce the impact of the leak, such as increase in exhaust temperature resulting from misfires due to fuel injector leaking fuel into the cylinder. Mitigating action may include increasing a fuel rail pressure to a preselected pressure and maintaining the pressure for a threshold number of cycles in order to blow out/suck out any blockage if present that may prevent the fuel injector from closing completely. Details of performing the mitigating actions will be further elaborated with respect to FIG. 3B.

Figure 3B:
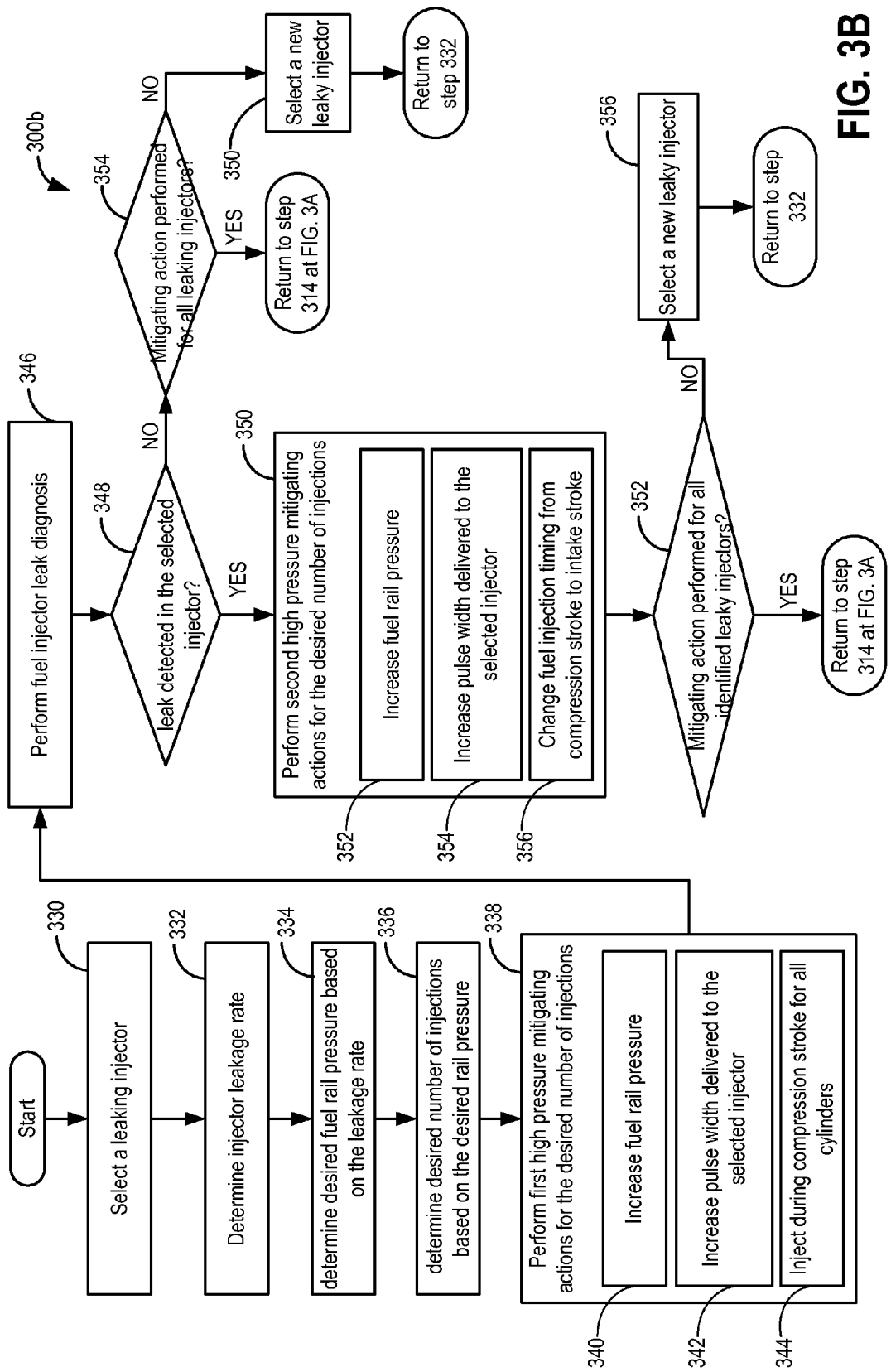
FIG. 3B shows a flow chart illustrating an example method for performing high pressure mitigating actions in response to detecting fuel injector leak.

Turning now to FIG. 3B, a method 300b for performing a first and second set of mitigating actions in response to detecting a leaking fuel injector (such as the leaking injector detected at step 310 in FIG. 3A). The method of FIG. 3B may be included in the system of FIGS. 1-2 as executable instructions stored in non-transitory memory of a controller such as controller 12 depicted at FIGS. 1-2. Specifically, method 300b may include mitigating actions that may performed at a pressure greater than a threshold pressure in order to reduce an amount of blockage present in the leaking fuel injector, where the blockage may prevent the injector from closing completely and thus resulting in leakage.

At 330, method 300b may include selecting a leaking injector for performing mitigating actions. In one example, the selection may be random. In another example, the selection may be based on an amount of leakage. For example, when the selection is based on the amount of leakage, the injector with the greatest amount of leak may be selected first, followed by the injector with the second greatest amount of leak, and the injector with least amount of leak may be selected last.

Next, at 332, method 300*b* may include determining a leakage rate from the selected injector. For example, the leakage rate may be based on one or more of an amount of pressure drop measured at the start of injection, an amount of increase in crankshaft speed, and an amount of increase in engine torque due to the leaking injector. Upon determining the leakage rate, method 300*b* proceeds to 334.

At 334, method 300*b* may include determining a desired fuel rail pressure based on the leakage rate. For example, the desired rail pressure may be greater than a threshold pressure, and may increase as the leakage rate increases. In other words, for a greater leak, a higher desired rail pressure may be utilized so that sufficient rail pressure is available to blow out any potential blockage in the leaking injector. However, if the leakage rate is greater than a maximum threshold pressure, increasing the rail pressure may lead to excess fuel penalty. Therefore, when the leakage rate is greater than a threshold rate, the desired rail pressure may be set at the maximum threshold pressure and may not exceed the maximum threshold pressure.

Next, at 336, method 300*b* may include determining a desired number of injections based on the desired rail pressure and the leakage rate. For example, at higher rail pressures, fewer injections may be required to blow out any blockage in the leaking injector. Therefore, for a given leakage rate, the desired number of injections may decrease as the desired rail pressure increases. In one example, during a first condition, for a given leakage rate, the mitigation action may be performed at a higher rail pressure with fewer injections while during a second condition, for the given leakage rate, the mitigation action may be performed at a rail pressure lower than the higher rail pressure with more number of injections relative to the first condition. The first and the second conditions may be based on a duration available for performing the mitigation action.

Upon determining the desired fuel rail pressure, and the desired number of injections, method 300*b* proceeds to 338. At 338, method 300*b* may include performing a first set of mitigating actions for the desired number of injections. The first set of mitigating actions may include at 340, increasing the fuel rail pressure to the desired pressure; at 342, increasing pulse width applied to the selected injector to a first pulse width while a second pulse width (e.g., nominal pulse width) may be delivered to each of the remaining injectors; and at 344, injecting fuel during compression stroke for all cylinders. For example, on a 3 cylinder bank, pulse width to the selected injector may be increased while pulse width to the other two fuel injectors may be decreased in order to satisfy emission standards. As a further example, on a 3 cylinder bank, if a desired pulse width is 100 milliseconds for each fuel injector, the selected injector (with leakage) may receive first pulse width (e.g., 120 millisecond pulse width) greater than second pulse width (e.g., 90 millisecond pulse width) delivered to each of the other two fuel injectors assuming that the fuel injected is linear with respect to the pulse width. Further, the first pulse width may be based on the leakage rate. For example, the first pulse width may increase with increasing leakage rate. However, the first pulse width may not increase above a threshold pulse width in order to avoid fuel penalty at higher leakage rates.

Upon performing the first set of mitigating actions for the desired number of injections, method 300*b* proceeds to 346. At 346, method 300*b* may include performing fuel injector leak diagnostics, as discussed above with respect to step 306 at FIG. 3A to determine if the first set of mitigating actions has cleared any potential blockage to the injector. In other words, at 346, fuel injector leak diagnostics may be performed to determine if the selected injector continues to leak after the first set of mitigating actions. For example, it may be determined if the fuel injector leakage rate after the first set of mitigating actions has decreased below a threshold leakage rate.

Next, at 348, method 300*b* may include determining if leak is detected in the selected fuel injector. If the answer is NO, leak is not detected. In response to not detecting the leak, it may be inferred that the first set of mitigating actions has cleared the blockage in the selected injector. Accordingly, upon confirming that the selected fuel injector is not leaking, method 300*b* proceeds to 354. At 354, method 300*b* may include determining if the first set of mitigating actions has been performed on all detected leaking injectors. If the answer at 354 is YES, then high pressure mitigating actions have been performed on all leaking injectors. Accordingly, method 300*b* proceeds to 358. At 358, method 300*b* may include resuming engine operation based on current engine operating conditions which may include terminating the fuel injector diagnosis. If the answer at 354 is NO, method 300*b* proceeds to 360. At 360, a leaking injector for which the first set of mitigating actions has not been performed may be selected. Upon selecting the leaking injector, method 300*b* may return to step 332.

Returning to 348, if the answer is YES, leak is detected and accordingly, method 300*b* proceeds to 350. At 350, method 300*b* may include performing a second set of mitigating actions for the desired number of injections. While the present example illustrates performing the first and the second mitigating actions for equal number of cylinder cycles, in some examples, the first mitigating actions may be performed for a first number of cycles, the first number of cycles determined based on a first leakage rate determined prior to the first mitigating action. Likewise, the second mitigating actions may be performed for a second number of cycles determined based on a second leakage rate determined after the first mitigating actions and prior to the second mitigating actions. For example, if the first leakage rate is greater than the second leakage rate, the first number of cycles may be greater than the second number of cycles.

The second set of mitigating actions may include, at 352, increasing the fuel rail pressure to the desired rail pressure; at 354, increasing pulse width applied to the selected injector to a third pulse width while delivering a fourth pulse width to each of the remaining injectors; and at 356, injecting during intake stroke (that is, changing fuel injection timing from the compression stroke to intake stroke) for the cylinder receiving fuel from the selected leaking injector while injecting fuel during compression stroke for remaining cylinders. For example, on a 3 cylinder bank, pulse width to the selected injector may be increased while pulse width to the other two fuel injectors may be decreased in order to satisfy emission standards. As a further example, on a 3 cylinder bank, if a desired pulse width is 100 milliseconds for each fuel injector, the selected injector (with leakage) may receive the third pulse width (e.g., 120 millisecond pulse width) greater than the fourth pulse width (e.g., 90 millisecond pulse width) delivered to each of the other two fuel injectors assuming that the fuel injected is linear with respect to the pulse width. Further, the third pulse width may be based on the leakage rate. For example, the third pulse width may increase with increasing leakage rate. However, the third pulse width may not increase above a threshold pulse width in order to avoid fuel penalty at higher leakage rates. In this way, suction generated by delivering increased amount of fuel at high pressure during intake stroke may be utilized to facilitate removal of the deposits clogging the injector when blowing out the injector by delivering fuel at high pressure during compression stroke did not result in reducing the leak.

Upon performing the second set of mitigating actions, method 300*b* proceeds to 352. At 352, method 300*b* includes determining if either the first set, or the first set and the second set of mitigating actions have been performed for all leaking injectors. If the answer at 352 is NO, then the first set, or the first set and the second set of mitigating actions have not been performed for all leaking injectors. Accordingly, method 300*b* proceeds to 356. At 356, method 300*b* may include selecting a leaking injector for which the first set, or the first set and the second set of mitigating actions have not been performed in order to carry out high pressure mitigating actions to reduce blockage in the leaking injector. For example, if an injector I2 providing fuel to a cylinder 2 and an injector I3 providing fuel to cylinder 3 have been identified as leaking injectors, it may be determined if the first set or the first and the second set of mitigating actions have been performed on I2 and I3. If the mitigating actions have been performed only on I2, then injector I3 may be selected for high pressure mitigating actions. Upon selecting the leaking injector, method 300*b* may return to step 332.

Returning to 352, if the answer at 352 is YES, method 300*b* returns to step 314 at FIG. 3A. That is, if the first set, or the first set and the second set of high pressure mitigating actions have been performed on all leaking injectors, the method returns to step 314 at FIG. 3A.

Returning to FIG. 3A, upon performing high pressure mitigating actions as discussed at FIG. 3B, method 300*a* proceeds to 314. At 314, method 300*a* includes performing fuel injector leak diagnosis to determine if the high pressure mitigating actions performed on the leaking injectors have resulted in reducing or stopping the leak. In one example, performing fuel injector leak diagnosis may include monitoring a change in fuel rail pressure at a start of injection event. For example, fuel injector leak may be diagnosed in response to the change being less than a threshold amount. In another example, performing fuel injector leak diagnosis may include monitoring a change in rail pressure over a period of time during a DFSO operation; and determining fuel injector leak in response a change in fuel rail pressure during DFSO greater than a threshold amount. In still another example, performing fuel injector leak diagnosis may include monitoring an increase in crankshaft acceleration or gas torque output during a DFSO condition; and determining fuel injector leak in response to the increase in crankshaft acceleration greater than a threshold amount.

Upon performing fuel injector leak diagnosis, method 300*a* proceeds to 316. At 316, method 300*a* may include confirming is fuel injector leak is detected. If the answer is YES, the fuel injector leak continues to be present after the high pressure mitigating actions. Accordingly, mitigating actions to manage the leak may be performed. Therefore, upon confirming fuel injector leak at 316, method 300*a* proceeds to 317. If fuel injector leak is not confirmed at 316, method 300*a* proceeds to 326. At 326, method 300*a* may include resuming engine operation based on current engine operating conditions. For example, in response to not detecting fuel injector leak following the high pressure mitigating actions, it may be inferred that the high pressure mitigating actions have resulted in clearing the blockage at the identified leaking injectors. Accordingly, fuel injector diagnosis and mitigation may be terminated and the engine operation may resume based on engine operating conditions.

At 317, method 300*a* may include performing shift schedule mitigating actions to unclog fuel injector. Shift schedule mitigating actions may include operating the vehicle at a highest load by shifting to a highest gear in order to increase a relative fuel injection amount thereby increasing the amount of time pressurized fuel has to act on any trapped particles clogging the injector. Subsequently, the vehicle may be operated at a lowest gear in order to increase a vacuum pressure inside the corresponding cylinder which may assist in dislodging the trapped particles in the leaking fuel injector. Details of performing shift schedule mitigating actions will be further elaborated with respect to FIG. 3C.

Upon performing shift schedule mitigating actions, method 300*a* may proceed to 318. At 318, method 300*a* includes performing fuel injector leak diagnosis to determine if the shift schedule mitigating actions performed on the leaking injectors have resulted in reducing or stopping the leak. As discussed above, in one example, performing fuel injector leak diagnosis may include monitoring a change in fuel rail pressure at a start of injection event. In another example, performing fuel injector leak diagnosis may include monitoring a change in rail pressure over a period of time during a DFSO operation; and determining fuel injector leak in response a change in fuel rail pressure during DFSO greater than a threshold amount. In still another example, performing fuel injector leak diagnosis may include monitoring an increase in crankshaft acceleration or gas torque output during a DFSO condition; and determining fuel injector leak in response to the increase in crankshaft acceleration greater than a threshold amount.

Upon performing fuel injector leak diagnosis, method 300*a* proceeds to 319. At 319, method 300*a* may include confirming is fuel injector leak is detected. If the answer is YES, the fuel injector leak continues to be present after the shift schedule mitigating actions. Accordingly, mitigating actions to manage the leak may be performed. Therefore, upon confirming fuel injector leak at 319, method 300*a* proceeds to 320. At 320, method 300*a* may include performing a third set of mitigating actions for all injectors. The third set of mitigating actions may be low pressure mitigating actions and may include, at 321 decreasing fuel rail pressure in order to reduce the fuel injector leak rate. For example, in response to determining that the fuel injector continues to leak after the high pressure mitigating actions, the fuel rail pressure may be decreased based on the leakage rate in order to reduce the fuel injector leakage rate. The decreased fuel rail pressure may be lower than the rail pressure for high pressure mitigating actions. In one example, the fuel rail pressure may be decreased below the threshold rail pressure. By reducing the fuel injector leak rate, the amount of fuel entering the exhaust due to leaking fuel injector may be reduced. Consequently, the amount of fuel available to participate in an exothermic reaction at the catalytic converter may be decreased thereby decreasing the amount of heat generated at the exhaust due to the leaking injector. The third set of mitigating actions may further include, at 322 adjusting the fuel injection timing for all cylinders to intake stroke. For example, fuel injection timing may be changed from compression stroke injection to intake stroke injection in order to be able to inject at decreased fuel rail pressures. In other words, fuel injection during intake stroke may be performed at lower fuel rail pressure compared to fuel injection during compression stroke. Therefore, since fuel rail pressure is decreased to reduce leakage rate, fuel injection timing may be adjusted to intake stroke.

Returning to 319, if fuel injector leak is not detected method 300a proceeds to 323. At 323, method 300a may include resuming engine operation based on current engine operating conditions. For example, in response to not detecting fuel injector leak following the shift schedule mitigating actions, it may be inferred that the mitigating actions have resulted in clearing the blockage at the identified leaking injectors. Accordingly, fuel injector diagnosis and mitigation may be terminated and the engine operation may resume based on engine operating conditions.

Figure 3C:
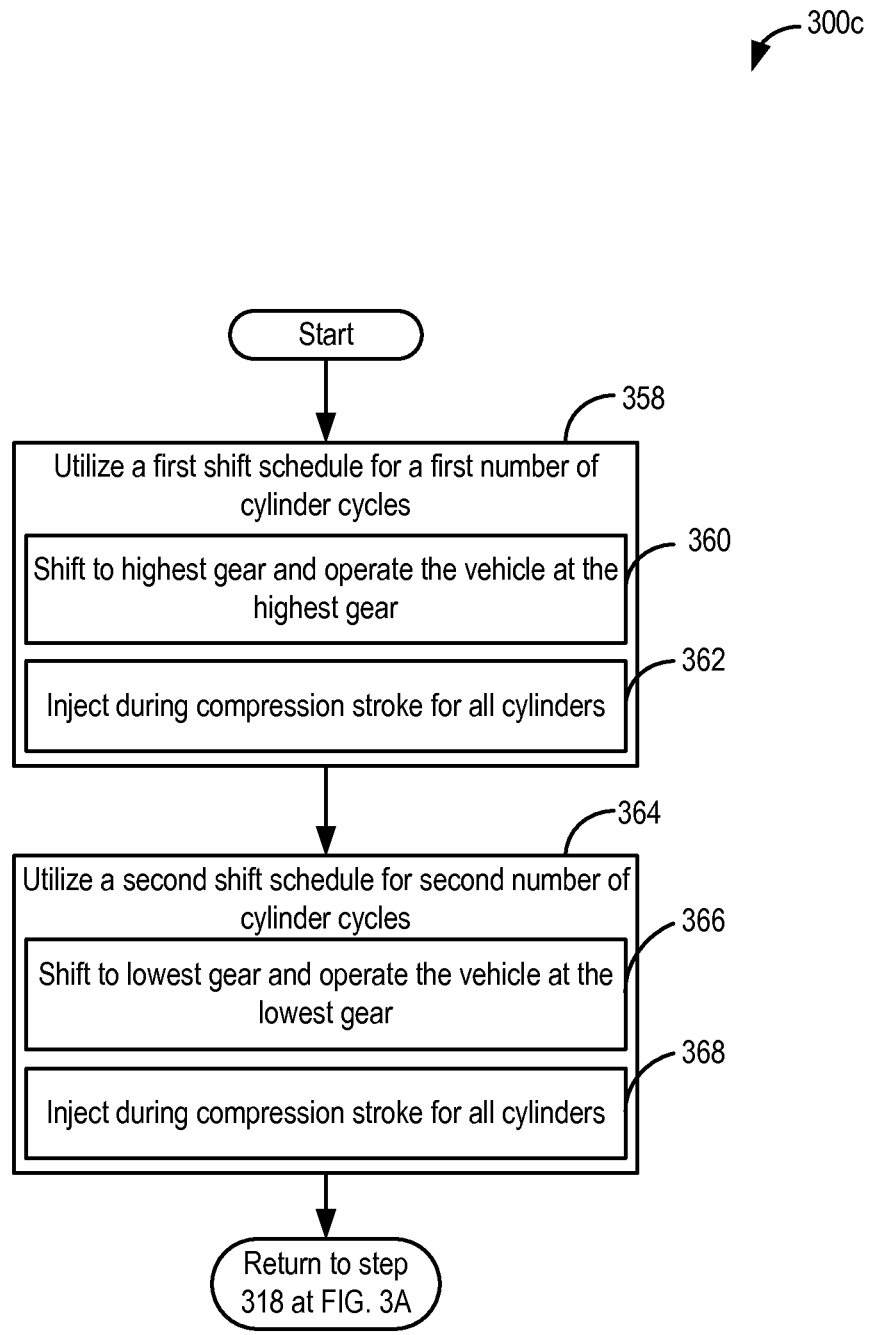
FIG. 3C shows a flow chart illustrating an example method for performing shift schedule mitigating actions in response to the fuel injector leak.

Turning now to FIG. 3C, a method 300c for performing shift schedule mitigating actions in response to detecting fuel injector leak (e.g., at step 316 at FIG. 3A). For example, if the high pressure mitigating actions (e.g., high pressure mitigating actions at FIG. 3B) do not result in stopping the leakage (that is, if leak persists after high pressure mitigating actions), shift schedule mitigating actions may be performed to unclog any leaking fuel injectors prior to performing low pressure intake stroke mitigating actions (e.g., low pressure mitigating actions at step 320 at FIG. 3A). While the given example illustrates performing shift schedule mitigating actions subsequent to high pressure mitigating actions, it will be appreciated that the shift schedule mitigating actions may be performed before the high pressure mitigating actions. Alternatively, the shift schedule mitigating actions may be performed after the first high pressure mitigating actions and before the second high pressure mitigating actions. The method of FIG. 3C may be included in the system of FIGS. 1-2 as executable instructions stored in non-transitory memory of a controller such as controller 12 depicted at FIGS. 1-2.

At 358, method 300c includes utilizing a first shift schedule for a first number of cylinder cycles. Utilizing the first shift schedule for the first number of cylinder cycles may include, at 360, shifting to the highest gear from a current desired operating gear and thereby, operating the vehicle at highest load. The first number of cylinder cycles may be based on the leakage rate of the leaking fuel injector. Further, utilizing the first shift schedule may include, at 362, injecting fuel during compression stroke. Operating the vehicle at highest load may increase a relative fuel injection amount. As a result, a duration of time available for the pressurized fuel to act on any trapped particles clogging the fuel injector may increase, which may facilitate in dislodging the trapped particles. For example, the vehicle may be operating at a desired gear (e.g., third gear). During shift schedule mitigating actions utilizing the first shift schedule, the vehicle may be operated at the highest gear (e.g., fifth gear) for the first number of cylinder cycles.

Upon operating the vehicle at the highest gear for the first number of cylinder cycles, method 300c proceeds to 364. At 364, method 300c includes utilizing a second shift schedule for a second number of cylinder cycles. Utilizing the second shift schedule for the second number of cylinder cycles may include, at 366, shifting to the lowest gear from the highest operating gear and thereby, operating the vehicle at highest engine speed and lowest load. The second number of cylinder cycles may be based on the leakage rate of the leaking fuel injector. Further, utilizing the second shift schedule may include, at 368, injecting fuel during compression stroke. Operating the vehicle at the lowest gear may increase vacuum pressure inside the cylinder, which may facilitate in dislodging any trapped particles. For example, the vehicle may be operating at a highest gear (e.g., fifth gear). During shift schedule mitigating actions utilizing the second shift schedule, the vehicle may be shifted from the highest gear (e.g., fifth gear) to the lowest gear (e.g. first gear) for the second number of cylinder cycles.

Upon operating the vehicle at the lowest gear for the second number of cylinder cycles, method 300c may return to step 318 at FIG. 3A.

In one example, the steps of shifting from the desired gear to the highest gear and subsequently shifting to the lowest gear may be repeated for a desired number of times, where the desired number is based on the leakage rate.

While the above example illustrates operating at the highest gear and then operating at the lowest gear, it will be appreciated that the vehicle operation may be shifted to the lowest gear and subsequently shifted to the highest gear, and the steps of shifting from the desired gear to the lowest gear and subsequently shifting to the highest gear may be performed for the desired number of times.

In another example, the transitions from the highest gear or lowest gear to lowest gear or highest gear may be performed for the desired number of times.

In this way, fuel injector leak may be diagnosed and mitigating actions may be performed to reduce fuel injector leak.

In one example, FIGS. 3A-3C may provide a method, comprising: in response to diagnosing leak in a fuel injector, performing first high pressure mitigating actions for a first number of cylinder cycles, the first mitigating actions including increasing fuel rail pressure to a first rail pressure; and injecting fuel to all cylinders during compression stroke; and if the leak persists, reducing the rail pressure to a low rail pressure; and injecting fuel to all cylinders during intake stroke. The method may include wherein the first mitigating actions further include increasing a pulse width delivered to the injector to a first pulse width while delivering a second pulse width to each of remaining injectors, the second pulse width less than the first pulse width.

The method further comprises, in response to detecting leak in the fuel injector after the first mitigating actions, performing second high pressure mitigating actions for a second number of cylinder cycles, the second mitigating actions including, increasing fuel rail pressure to a second rail pressure; increasing pulse width delivered to the fuel injector to a third pulse width while delivering minimum fourth pulse width less than the third pulse width to the remaining injectors; and injecting fuel to a cylinder receiving fuel from the injector during intake stroke while injecting fuel to remaining cylinders during compression stroke. The method includes wherein persistence of leak in the injector is determined based on detecting leak in the injector after the second mitigating actions. Further, the method includes wherein the fuel injector is a direct fuel injector.

Still further, the method includes wherein the first rail pressure is based on a first leakage rate of the injector determined prior to the first mitigating actions; wherein the first number of cylinder cycles is based on the first rail pressure; wherein the second rail pressure is based on a second leakage rate of the injector determined after the first mitigating actions and prior to the second mitigating actions; and wherein the second number of cylinder cycles is based on the second rail pressure.

Further the method includes wherein the low rail pressure is based on a third leakage rate of the injector determined after the second mitigating actions and prior to the reduction of the rail pressure; and wherein the low rail pressure is lower than the first rail pressure, and the second rail pressure.

The method includes wherein the first number of injections decreases with increase in first rail pressure; and wherein the second number of injections decreases with increase in the second rail pressure. Further, the method includes, in response to persistent leak shifting operation of a vehicle including the injector from a desired gear to a highest gear, and subsequently shifting operation of the vehicle from the highest gear to the lowest gear prior to operating at the low rail pressure.

Turning to FIG. 4, map 400 illustrates an engine position along the x-axis in crank angle degrees (CAD). Curve 402 depicts piston positions (along the y-axis), with reference to their location before top dead center (BTDC) and/or after top dead center (ATDC), and further with reference to their location within the four strokes (intake, compression, power and exhaust) of an engine cycle. As indicated by sinusoidal curve 402, a piston gradually moves downward from TDC, bottoming out at BDC by the end of the intake stroke. The piston then returns to the top, at TDC, by the end of the compression stroke. The piston then again moves back down, towards BDC, during the power stroke, returning to its original top position at TDC by the end of the exhaust stroke.

The second plot (from the top) of map 400 depicts an example fuel injection profile 404 that may be when fuel injector leak is not detected.

The third plot (from the top) of map 400 depicts example fuel injection profile 406 that may be used during first high pressure mitigating actions in response to detecting fuel injector leak.

The fourth plot (from the top) of map 400 depicts example fuel injection profile 408 that may be used during second high pressure mitigating actions in response to detecting fuel injector leak.

The fifth plot (from the top) of map 400 depicts example fuel injection profile 410 that may be utilized during low pressure mitigating actions which may be performed in response to determining that high pressure mitigating actions have not reduced the leakage rate to below a threshold leakage rate.

Fuel injection profile 404 may be utilized when fuel injector leak is not detected. As shown at 404, when fuel injector leak is not detected, fuel injection may be performed during compression stroke; and fuel injector pulse width d1 and a fuel rail pressure (not shown) may be adjusted to deliver a desired amount of fuel. The desired amount of fuel may be determined based on current engine operating conditions including engine speed, load, etc. As discussed above with respect to FIGS. 3A and 3B, in response to determining a leaking injector, first high pressure mitigating actions may be performed. When the first high pressure mitigating actions are performed, fuel injection profile 406 may be utilized. The first high pressure mitigating actions may include increasing fuel rail pressure to a first desired fuel rail pressure greater than the fuel rail pressure when no leak is detected. The first desired fuel rail pressure may be determined based on a leakage rate of the leaking injector. The first high pressure mitigating actions may further include increasing pulse width to pulse width d2 delivered to the leaking injector. In some examples, pulse width d2 may be greater than d1. In some other examples, pulse width d2 may be equal to d1. As such, the pulse width may be based on the leakage rate. Further when performing the first high pressure mitigating actions, the fuel injection may be performed at compression stroke as shown at 406. By increasing the fuel rail pressure, and increasing the pulse width, an amount of fuel injected at high pressure during a cylinder cycle may be increased. By injecting a greater amount of fuel at higher pressure, potential blockage clogging the fuel injector may be released. Further, the first high pressure mitigating actions may be performed for a first number of cylinder cycles. The first number of cylinder cycles may be determined based on the desired rail pressure. In this way, the first high pressure mitigating actions may be performed to blow out potential fuel contaminants that may clog the fuel injector and prevent the fuel injector from closing.

However, if the leaking injector continues to leak after completing the first high pressure mitigating actions, second high pressure mitigating actions may be performed. That is, if the first high pressure mitigating actions do not clear the blockage, second high pressure mitigating actions may be performed for a second number of cylinder cycles. The second high pressure mitigating actions may include increasing the fuel rail pressure to a second desired rail pressure, and utilizing fuel injection profile 408. In one example, the second desired rail pressure may be equal to the first desired rail pressure. In another example, the second desired rail pressure may be lower than the first desired rail pressure. Further, during the second high pressure mitigating action, utilizing the fuel injection profile 408 may include injecting fuel during the intake stroke (that is changing fuel injection timing from compression stroke to intake stroke) and increasing the pulse width to the injector. For example, pulse width may be set to d3 during the second high pressure mitigating actions so that amount of fuel delivered during the second high pressure mitigating actions may be increased. In one example, d3 may be equal to d2. In some other examples, d3 may be less than d2. Further, in all examples, d3 may be greater than or equal to d1. As discussed above, increasing the fuel rail pressure, and increasing the pulse width may increase the amount of fuel injected at high pressure. Further, changing the fuel injection timing from compression stroke to intake stroke may facilitate removal of the blockage by suction. In this way, in response to the first high pressure mitigating actions not stopping the leak from the leaking injection, the second high pressure mitigating actions may be performed to draw out potential fuel contaminants that may clog the fuel injector.

Still further, if the second high pressure mitigating actions do not result in stopping the leakage, low pressure mitigating actions may be performed. Performing low pressure mitigating actions may include, decreasing the fuel rail pressure to a third desired rail pressure to reduce the leakage rate, and adjusting fuel injection timing to intake stroke injection as shown at profile 410. As cylinder pressures are lower during the intake stroke compared to the compression stroke, adjusting fuel injection timing from compression stroke to intake stroke enables fuel injection at lower fuel rail pressure. As a result, fuel leakage rate may be reduced. Further, pulse width d4 supplied to the fuel injector during low pressure mitigating actions may be less than d2, and d3. In one example, in addition to decreasing rail pressure and changing fuel injection to intake stroke, for a given engine operating condition, pulse width supplied to an injector when no leak is detected may be greater than pulse width supplied to the injector when low pressure mitigating actions are performed. By decreasing the pulse width during low pressure mitigating actions (in addition to decreasing fuel rail pressure and changing injection timing), fuel injector leakage may be further reduced. However, in some examples, pulse width supplied to an injector when no leak is detected may be equal to the pulse width supplied to the injector during low pressure mitigating actions. Further still, decreasing the fuel rail pressure and injecting fuel during the intake stroke may limit an amount of boost available. Accordingly, desired boost may be adjusted in order to maintain the exhaust air/fuel ratio near stoichiometry.

In this way, fuel injection timing may be adjusted during high pressure mitigating actions to blow out or suck out any contaminants in the fuel injector clogging the injector and causing the leakage. Further, fuel injection timing may be adjusted during low pressure mitigating actions to reduce leakage rate.

In one example, in addition to reducing fuel rail pressure and changing fuel injection timing from compression stroke injection to intake stroke injection, spark timing may be adjusted. For example, spark timing may be advanced before MBT timing when possible so as to reject more heat to the engine block rather than rejecting the heat to the exhaust. Advancing the spark timing before MBT timing may be performed during both high pressure mitigating actions and low pressure mitigating actions. Turning to FIG. 5, it shows operating sequence 500 depicting example mitigating actions that may be performed in response to detecting leakage from a fuel injector (such as one of fuel injectors 254 shown at FIG. 2, or fuel injector 66 shown at FIG. 1). The sequence of FIG. 5 may be provided by executing instructions in the system of FIGS. 1-2 according to the method of FIGS. 3A-3B. Vertical markers at times t0-t3 represent times of interest during the sequence. In all the plots discussed below, the X axis represents time and time increases from the left side of the plot to the right side of the plot.

The first plot from the top of FIG. 5 represents fuel rail pressure versus time. The Y axis represents fuel rail pressure and fuel rail pressure increases in the direction of Y axis arrow.

The second plot from the top of FIG. 5 represents fuel injector leak rate versus time. The Y axis represents fuel injector leak rate and rate increases in the direction of Y axis arrow.

The third plot from the top of FIG. 5 represents fuel injection timing versus time. The Y axis represents fuel injection timing including compression stroke injection and intake stroke injection.

The fourth plot from the top of FIG. 5 represents maximum boost available versus time. The Y axis represents maximum boost available and the maximum boost available increases in the direction of the Y axis arrow.

Prior to time t1, fuel injector leak may not be detected. For example, engine operating conditions may not support performing fuel injector diagnosis, and accordingly fuel injector leak diagnosis may not be performed and any potential leak that may be present may not be detected. However, in another example, fuel injector leak diagnosis may be performed, and the diagnosis may not detect any leak. Accordingly, in response to not detecting leak prior to t1, engine may be operated based on current engine operating conditions. For example, fuel may be injected during compression stroke at a desired fuel rail pressure (the desired rail pressure determined based on current engine operating conditions) in order to deliver a desired amount of fuel.

At time t1, engine operating conditions may favor fuel injector leak diagnostics, and accordingly a first leak diagnosis may be performed. Details of performing leak diagnosis are elaborated with respect to FIGS. 3A and 3B. Further, for the sake of clarity, changes in rail pressure during leak diagnosis are not indicated in this example. The first leak diagnosis may identify leakage (504) in a fuel injector (such as one of fuel injectors 254 shown at FIG. 2, or fuel injector 66 shown at FIG. 1), herein referred to as the leaking injector. In the example discussed herein at FIG. 5, no leak may be identified in the remaining fuel injectors. Accordingly, first high pressure mitigating actions may be performed between t1 and t2 for a first number of cylinder cycles to mitigate leak in the leaking injector. Performing first high pressure mitigating actions may include increasing fuel rail pressure (502) to a first desired rail pressure determined based on a leakage rate of the leaking injector; increasing pulse width to the leaking injector while a nominal pulse width may be maintained for the remaining fuel injectors (as discussed at FIGS. 3B and 4) so as to maintain emission standards; and injecting during compression stroke (506) during each cylinder cycle of the first number of cylinder cycles. For example, the leaking injector may receive a first pulse width greater than a second pulse width delivered to each of the remaining fuel injectors.

Upon completing the first high pressure mitigating actions for the first number of cycles, at t2 a second leak diagnosis may be performed to determine if the first high pressure mitigating actions have blown out any potential contaminate clogging the fuel injector. In other words, the second leak diagnosis may be performed to determine if the first high pressure mitigating actions have resulted in stopping leak from the leaking fuel injector. As discussed above, details of performing leak diagnosis are elaborated with respect to FIGS. 3A and 3B. The second leak diagnosis may continue to show leak in the leaking injector indicating that the first high pressure mitigating actions did not stop the leakage. Accordingly, between t2 and t3, second high pressure mitigating actions may be performed for a second number of cylinder cycles, which may include increasing the fuel rail pressure to a second desired rail pressure (502); increasing pulse width to the leaking injector while a nominal pulse width may be maintained for the remaining fuel injectors (as discussed at FIGS. 3B and 4); and adjusting fuel injection timing from compression stroke to intake stroke. For example, the leaking injector may receive a third pulse width greater than a fourth pulse width delivered to each of the remaining fuel injectors. Further, the fuel injection timing may be adjusted from compression stroke to intake stroke for the cylinder receiving fuel from the identified leaking injector while fuel injection the remaining cylinders may be performed during compression stroke. The second desired rail pressure may be based on the leakage rate determined at the time of the second leak diagnosis, and the second number of cylinder cycles may be based on the second rail pressure. While the example illustrated herein shows maintaining the same high pressure during the first and second mitigating actions, it must be appreciated that in some examples, the second desired rail pressure may be less than the first desired rail pressure and greater than the rail pressure when mitigating actions are not performed. By increasing the rail pressure and increasing the pulse width, fuel injection amount may be increased. Further, by injecting increased amounts of fuel during the intake stroke at high pressure, contaminates that may clog the fuel injector and cause leakage may be removed by suction.

Next, upon completing the second high pressure mitigating actions, at t3 a third fuel leak diagnosis may be performed to determine if the leak continues to the present. The third leak diagnosis may continue to show leak in the leaking injector indicating that the first high pressure mitigating actions and the second high pressure mitigating actions did not stop the leakage. Accordingly, at t3 and beyond, low pressure mitigating actions may be performed until the leak in the leaking injector is repaired. Low pressure mitigating actions may include decreasing the fuel rail pressure (502);

and adjusting fuel injection timing for all cylinders to intake stroke (506). Further, the maximum boost available may vary with respect to the fuel rail pressure and fuel injection timing. For example, during low pressure mitigating actions (e.g., at t3 and beyond), the maximum amount of boost available may be lower than during normal engine operation (e.g., between t0 and t1). Therefore, during low pressure mitigating actions, an amount of boost that may be provided may be limited. By performing low pressure mitigating actions when the high pressure mitigating actions did not stop the leakage, fuel injector leakage rate may be reduced (504). As a result, loss of fuel and fuel economy penalty due to injector leakage may be reduced.

In this way high pressure and low pressure mitigating actions may be performed to reduce leak from a leaking fuel injector.

In one example, the sequence of FIG. 5 may provide for a method, comprising: in response to diagnosing a leak in a fuel injector delivering fuel to a cylinder, performing first high pressure mitigating actions for a desired number of cylinder cycles followed by second high pressure mitigating actions for the desired number of cylinder cycles; and in response to determining persistence of the leak, performing low pressure mitigating actions; wherein the first high pressure mitigating actions include increasing a fuel rail pressure to a desired fuel rail pressure; increasing pulse width delivered to the injector to a first pulse width while delivering a second pulse width less than the first pulse width to each of remaining injectors; and commanding fuel injection to all cylinders during compression stroke.

The method further includes wherein the second high pressure mitigating actions include maintaining the fuel rail pressure at the desired fuel rail pressure; maintaining pulse width delivered to the injector at the first pulse width while delivering the second pulse width to each of remaining injectors; and commanding fuel injection to the cylinder receiving fuel from the injector during intake stroke while commanding fuel injection to remaining cylinders during compression stroke; and wherein the low pressure mitigating actions include reducing the fuel rail pressure; and commanding fuel injection to all cylinders during intake stroke.

The method includes wherein the fuel injector is a direct fuel injector; wherein the desired number of cylinder cycles is based on the desired rail pressure; and wherein the desired rail pressure is based on a first leakage rate of the injector determined prior to performing the first and the second high pressure mitigating actions.

The method further includes wherein the persistence of leak is determined based on a second leakage rate of the injector greater than a threshold rate after completing the first and the second high pressure mitigating actions.

In one example, the method includes wherein the leak is diagnosed based on a drop in a fuel rail pressure at a start of injection event less than a threshold drop.

In another example, the method includes wherein the leak is diagnosed based on a crankshaft acceleration greater than a threshold acceleration during a deceleration fuel shut off condition.

While the above example illustrates selecting one leaking injector for mitigation action, and performing the mitigation action on the selected injector before proceeding to select the second injector for mitigating actions, it must be appreciated that the mitigating actions discussed above may be performed on more than one injector simultaneously.

Turning to FIG. 6, it shows operating sequence 600 depicting example shift schedule mitigating actions that may be performed in response to detecting leakage from a fuel injector (such as one of fuel injectors 254 shown at FIG. 2, or fuel injector 66 shown at FIG. 1). The sequence of FIG. 6 may be provided by executing instructions in the system of FIGS. 1-2 according to the method of FIG. 3C. Vertical markers at times t0-t3 represent times of interest during the sequence. In all the plots discussed below, the X axis represents time and time increases from the left side of the plot to the right side of the plot.

The first plot from the top of FIG. 6 represents fuel injector leak rate versus time. The Y axis represents fuel injector leak rate and rate increases in the direction of Y axis arrow.

The second plot from the top of FIG. 6 represents fuel injection timing versus time. The Y axis represents fuel injection timing including compression stroke injection and intake stroke injection.

The third plot from the top of FIG. 6 represents gear number versus time. The Y axis represents gear number and the gear number increases in the direction of the Y axis arrow. Horizontal line 608 represents desired gear.

Prior to t1, the vehicle may be operating at the desired gear 608, and leak may be present (602) in the fuel injector determined based on fuel injector leak diagnosis as discussed above with respect to FIG. 3A. Upon detecting fuel injector leak, shift schedule mitigating actions may be performed in order to unclog any particles clogging the fuel injector and thus causing the fuel injector to leak. Accordingly, at t1, vehicle operation may shift from operating at the desired gear to operating at the highest gear. Further, between t1 and t2, the vehicle may operate at the highest gear. Shifting to the highest gear from a current desired operating gear may result in operating the vehicle at highest load possible, which may increase a relative fuel injection amount. As a result, a duration of time available for the pressurized fuel to act on any trapped particles clogging the fuel injector may increase, which may facilitate in dislodging the trapped particles. Further, at t1, and between t1 and t2, the fuel may be injected during compression stroke (604).

Next, at t2, vehicle operation may shift to lowest gear from the highest gear, and between t2 and t3, the vehicle may continue to operate in the lowest gear, and the fuel may be injected during the compression stroke. Operating the vehicle at the lowest gear may increase vacuum pressure inside the cylinder, which may facilitate in dislodging any trapped particles.

Next, at t3 the vehicle operation may shift from operating at the lowest gear to operating at the highest gear, and between t3 and t4 the vehicle may continue to operate in the highest gear. Subsequently, at t4, the vehicle operation may shift from operating at the highest gear to operating at the lowest gear, and between t4 and t5 the vehicle may continue to operate in the lowest gear. Further, at t2, and between t2 and t5, fuel may be injected during compression stroke.

At t5, fuel injector leak diagnosis may indicate fuel injector leak after the shift schedule mitigating actions. According, low pressure mitigating actions including reducing fuel rail pressure and injecting during intake stroke may be performed to reduce the leakage rate. However, if fuel injector leak is not detected after the shift schedule mitigating actions, the vehicle may resume normal operation based on current operating conditions.

In some examples, the shift schedule mitigating actions may be performed in addition to the high pressure mitigating actions (e.g., high pressure mitigating actions at FIG. 3B). In some other examples, the shift schedule mitigating actions may be performed alternative to the high pressure mitigating actions.

In still further examples, mitigating actions may include intentionally knocking the problem cylinder to agitate any build-up on the clogged injector.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
in response to diagnosing, with an engine controller, a leak in a fuel injector,
performing, with the controller, first high pressure mitigating actions for a first number of cylinder cycles, the first mitigating actions including increasing fuel rail pressure to a first rail pressure; and injecting fuel, via the fuel injector, to all cylinders during a compression stroke; and
if the leak persists, reducing, with the controller, the fuel rail pressure to a low rail pressure; and injecting fuel, via the fuel injector, to all cylinders during an intake stroke.

2. The method of claim 1, wherein the first mitigating actions further include increasing a pulse width delivered to the fuel injector to a first pulse width while delivering a second pulse width to each of remaining injectors, the second pulse width less than the first pulse width.

3. The method of claim 2, further comprising, in response to detecting, with the controller, the leak in the fuel injector after the first mitigating actions, performing second high pressure mitigating actions for a second number of cylinder cycles, the second mitigating actions including, increasing fuel rail pressure to a second rail pressure; increasing the pulse width delivered to the fuel injector to a third pulse width while delivering a fourth pulse width less than the third pulse width to each of the remaining injectors; and injecting fuel to a cylinder receiving fuel from the fuel injector during the intake stroke while injecting fuel to remaining cylinders during the compression stroke.

4. The method of claim 3, wherein persistence of the leak in the fuel injector is determined based on detecting the leak in the fuel injector after the second mitigating actions.

5. The method of claim 4, wherein the fuel injector is a direct fuel injector.

6. The method of claim 3, wherein the first rail pressure is based on a first leakage rate of the fuel injector determined prior to the first mitigating actions; and wherein the first number of cylinder cycles is based on the first rail pressure.

7. The method of claim 6, wherein the second rail pressure is based on a second leakage rate of the fuel injector determined after the first mitigating actions and prior to the second mitigating actions; and wherein the second number of cylinder cycles is based on the second rail pressure.

8. The method of claim 7, wherein a first number of injections decreases with an increase in the first rail pressure; and wherein a second number of injections decreases with an increase in the second rail pressure.

9. The method of claim 3, wherein the low rail pressure is based on a third leakage rate of the fuel injector determined after the second mitigating actions and prior to the reduction of the fuel rail pressure; and wherein the low rail pressure is lower than the first rail pressure and the second rail pressure.

10. The method of claim 1, further comprising, in response to the persistent leak, shifting operation of a vehicle including the fuel injector from a desired gear to a highest gear, and subsequently shifting operation of the vehicle from the highest gear to a lowest gear prior to operating at the low rail pressure.

11. A method for an engine, comprising:
in response to diagnosing, with an engine controller, a leak in a fuel injector delivering fuel to a cylinder of the engine, performing, with the controller, first high pressure mitigating actions for a desired number of cylinder cycles followed by second high pressure mitigating actions for the desired number of cylinder cycles; and
in response to determining, with the controller, persistence of the leak, performing, with the controller, low pressure mitigating actions.

12. The method of claim 11, wherein the first high pressure mitigating actions include increasing a fuel rail pressure to a desired fuel rail pressure; increasing a pulse width delivered to the fuel injector to a first pulse width while delivering a second pulse width to each of remaining injectors; and commanding, with the controller, fuel injection to all cylinders during a compression stroke.

13. The method of claim 12, wherein the second high pressure mitigating actions include maintaining the fuel rail pressure at the desired fuel rail pressure; maintaining the pulse width delivered to the fuel injector at the first pulse width while delivering the second pulse width to each of the remaining injectors; and commanding, with the controller, fuel injection to the cylinder receiving fuel from the fuel injector during an intake stroke while commanding, with the controller, fuel injection to remaining cylinders during the compression stroke.

14. The method of claim 13, wherein the low pressure mitigating actions include reducing the fuel rail pressure; and commanding fuel injection to all cylinders during the intake stroke.

15. The method of claim 14, wherein the fuel injector is a direct fuel injector; wherein the desired number of cylinder cycles is based on the desired fuel rail pressure; and wherein the desired fuel rail pressure is based on a first leakage rate of the fuel injector determined prior to performing the first and the second high pressure mitigating actions.

16. The method of claim 11, wherein the leak is diagnosed based on a drop in a fuel rail pressure at a start of injection event less than a threshold drop.

17. The method of claim 11, wherein the leak is diagnosed based on a crankshaft acceleration greater than a threshold acceleration during a deceleration fuel shut off condition.

18. The method of claim 11, wherein the persistence of the leak is determined based on a second leakage rate of the fuel injector greater than a threshold rate after completing the first and the second high pressure mitigating actions.

19. A system, comprising:
an engine including a cylinder;
a direct fuel injector in fluidic communication with the cylinder; and
a controller including executable instructions stored in non-transitory memory for:
    in response to diagnosing a leak in the fuel injector, for a first number of cylinder cycles, increasing a fuel rail pressure of a fuel rail delivering fuel to the fuel injector to a first rail pressure above a threshold pressure; and commanding fuel injection during a compression stroke; and
    in response to continued detection of the leak after the first number of cylinder cycles, for a second number of cylinder cycles, increasing the fuel rail pressure to a second rail pressure above the threshold pressure; and commanding fuel injection during an intake stroke for the cylinder while commanding fuel injection during the compression stroke for remaining cylinders in the engine.

20. The system of claim 19, wherein the controller includes further instructions for reducing the fuel rail pressure to a third rail pressure lower than the threshold pressure, and commanding fuel injection to all cylinders in the engine during the intake stroke in response to the continued detection of the leak in the fuel injector after performing the second number of cylinder cycles.

* * * * *